United States Patent
Aoki et al.

(10) Patent No.: US 10,814,594 B2
(45) Date of Patent: Oct. 27, 2020

(54) LAMINATED FOAM INTERLEAF SHEET FOR GLASS PLATES

(71) Applicant: JSP CORPORATION, Tokyo (JP)

(72) Inventors: Takeshi Aoki, Nikko (JP); Takashi Nishimoto, Utsunomiya (JP); Ryohei Takeuchi, Utsunomiya (JP)

(73) Assignee: JSP CORPORATION, Tokyo (JP)

(*) Notice: Subject to any disclaimer, the term of this patent is extended or adjusted under 35 U.S.C. 154(b) by 343 days.

(21) Appl. No.: 15/082,547

(22) Filed: Mar. 28, 2016

(65) Prior Publication Data

US 2016/0311202 A1  Oct. 27, 2016

(30) Foreign Application Priority Data

Apr. 27, 2015 (JP) ................ 2015-090420

(51) Int. Cl.
| | | |
|---|---|---|
| *B32B 27/06* | (2006.01) | |
| *B32B 27/08* | (2006.01) | |
| *B32B 27/32* | (2006.01) | |
| *B32B 27/36* | (2006.01) | |
| *B32B 5/18* | (2006.01) | |
| *B32B 3/30* | (2006.01) | |
| *B32B 27/30* | (2006.01) | |

(52) U.S. Cl.
CPC ............ *B32B 27/065* (2013.01); *B32B 3/30* (2013.01); *B32B 5/18* (2013.01); *B32B 27/302* (2013.01); *B32B 27/32* (2013.01); *B32B 2250/03* (2013.01); *B32B 2250/40* (2013.01); *B32B 2264/10* (2013.01); *B32B 2264/102* (2013.01); *B32B 2266/025* (2013.01); *B32B 2270/00* (2013.01); *B32B 2307/21* (2013.01); *B32B 2307/51* (2013.01); *B32B 2307/538* (2013.01); *B32B 2307/54* (2013.01); *B32B 2307/718* (2013.01); *B32B 2307/72* (2013.01); *B32B 2307/746* (2013.01); *B32B 2553/02* (2013.01); *B32B 2571/00* (2013.01)

(58) Field of Classification Search
CPC ............ B32B 27/065; B32B 2307/54; B32B 2571/00; B32B 27/302; B32B 2307/72; B32B 2307/718; B32B 2307/746; B32B 2307/538; B32B 2307/51; B32B 2270/00; B32B 2264/102; B32B 2264/10; B32B 5/18; B32B 2553/02; B32B 2266/025; B32B 2250/03; B32B 2250/40; B32B 27/32; B32B 2307/21; B32B 3/30

See application file for complete search history.

(56) References Cited

U.S. PATENT DOCUMENTS

| | | | | |
|---|---|---|---|---|
| 2004/0262802 A1* | 12/2004 | Morita | ............... | B29C 44/22 264/45.9 |
| 2013/0316138 A1* | 11/2013 | Ikenaga | ............... | C03C 17/32 428/141 |
| 2014/0070442 A1* | 3/2014 | Morita | ............... | C08L 23/0815 264/46.4 |
| 2015/0218332 A1* | 8/2015 | Nishimoto | ............... | C08J 9/08 428/220 |

FOREIGN PATENT DOCUMENTS

| | | | |
|---|---|---|---|
| JP | 2007-262409 A | | 10/2007 |
| JP | 2008274072 A | * | 11/2008 |
| JP | 2010-247529 A | | 11/2010 |
| JP | 2014208543 A | * | 11/2014 |
| WO | WO-2011006031 A2 | * | 1/2011 ............ B65D 57/00 |
| WO | WO-2014030513 A1 | * | 2/2014 |

OTHER PUBLICATIONS

Translation to English for JP 2007-262409 by Espacenet. accessed Mar. 27, 2018. (Year: 2007).*
Translation to English JP 2008-274072 A. accessed Dec. 26, 2018. (Year: 2008).*
Translation to English of JP 2014-208543 A via espacenet. accessed Feb. 26, 20202 (Year: 2014).*

* cited by examiner

*Primary Examiner* — Nancy R Johnson
(74) *Attorney, Agent, or Firm* — Bacon & Thomas, PLLC

(57) ABSTRACT

A laminated foam interleaf sheet for being interposed between glass plates, having a foam layer of a polyethylene-based resin, and an antistatic layer which is laminated on each of both sides of the foam layer and contains a polyethylene-based resin, a polystyrene-based resin and a polymeric antistatic agent, the laminated foam interleaf sheet having a surface roughness Ra of 30 μm or less.

8 Claims, No Drawings

LAMINATED FOAM INTERLEAF SHEET FOR GLASS PLATES

BACKGROUND OF THE INVENTION

The present invention relates generally to a composite sheet and, more specifically, to a laminated foam interleaf sheet for being interposed between glass plates.

When glass plates for use as liquid crystal display panels, etc. are transported in a stacked state, interleaf sheets have been hitherto interposed between adjacent glass plates for the protection thereof. As such an interleaf sheet, use of a polyethylene-based resin foam sheet is proposed in recent years as a substitute for a cellulose paper. For example, JP-A-2007-262409 discloses an extruded polyethylene-based resin foam interleaf sheet containing a polymeric antistatic agent. JP-A-2010-247529 discloses a laminated foam interleaf sheet for glass plates having a polyethylene resin foam layer and a polyethylene resin layer which is laminated on at least one side of the foam layer and which contains a polymeric antistatic agent.

SUMMARY OF THE INVENTION

A foam interleaf sheet interposed between glass plates can protect the glass plates because of its cushioning property, thin thickness and lightness in weight. In order to obtain sufficiently satisfactory cushioning property, however, it has been found to be necessary that the foam interleaf sheet should be tightly held between adjacent glass plates and must not move relative thereto even when the glass plates vibrate during transportation. If the foam interleaf sheet displaces, there is a danger that the glass plates will be injured or broken. Namely, when glass plates are packed in a stacked state with foam interleaf sheets being interposed between them, it has been found to be important that the foam interleaf sheets which are subjected to a high load should be held in tight contact with the adjacent glass plates with a high gripping force, so that, even when the package vibrates during transportation, the foam interleaf sheets are prevented from displacing relative to the glass plates.

It is also found important that the foam interleaf sheet should be easily conveyed and placed in position between glass plates. Generally, a foam interleaf sheet is produced in the form of a roll and, in use, unrolled from the roll, cut into a foam interleaf sheet having a suitable length, and then conveyed to a predetermined location where it is placed on a glass plate supplied. The above procedures are repeated to obtain a stack of the glass plates with the foam interleaf sheets each being inserted between adjacent glass plates. In order to smoothly carry out these procedures, it is important that the foam interleaf sheet, to which no or small load is applied, has good slippage property.

Additionally, the foam interleaf sheet is desired to have such a degree of stiffness that, when the interleaf sheet is horizontally supported at its one end, the other free end thereof does not greatly droop downward by its own weight. Namely, vacuum suction is generally utilized to remove the interleaf sheets from between the glass plates. In this case, when the degree of drooping of the interleaf sheets is high, the removal work by vacuum suction cannot be efficiently carried out.

The known foam interleaf sheet for being interposed between glass plates fails to exhibit, at the same time, both good slippage property under a lowly loaded condition and a high gripping force under a highly loaded condition.

It is, therefore, an object of the present invention to provide a laminated foam interleaf sheet for being interposed between glass plates, which has excellent cushioning property and desired stiffness, which shows good slippage property under a lowly loaded condition and which exhibits a high gripping force under a highly loaded condition where the interleaf sheet is sandwiched between glass plates.

In accordance with one aspect of the present invention, there is provided:

[1] A laminated foam interleaf sheet for glass plates, comprising:
  a foam layer of a polyethylene-based resin, and
  an antistatic layer laminated on each of both sides of the foam layer and containing a polyethylene-based resin, a polystyrene-based resin and a polymeric antistatic agent,
  the laminated foam interleaf sheet having a surface roughness Ra of 30 μm or less.

In other aspects, the present invention provides:
[2] The laminated foam interleaf sheet according to above [1], wherein the polystyrene-based resin is present in the antistatic layer in an amount of 5 to 50% by weight;
[3] The laminated foam interleaf sheet according to above [1] or [2], wherein the polymeric antistatic agent is an ionomeric antistatic agent;
[4] The laminated foam interleaf sheet according to any one of above [1] to [3], wherein the polyethylene-based resin of the foam layer contains at least 50% by weight of low density polyethylene and the polyethylene-based resin of the antistatic layer contains at least 50% by weight of low density polyethylene;
[5] The laminated foam interleaf sheet according to any one of above [1] to [4], wherein the laminated foam interleaf sheet has an apparent density of 90 to 500 kg/m$^3$ and each of the antistatic layers has a basis weight of 5 g/m$^2$ or less; and
[6] The laminated foam interleaf sheet according to any one of above [1] to [5], wherein the antistatic layer has a tensile modulus of elasticity of at least 100 MPa.

The laminated foam interleaf sheet of the present invention, which is constituted as recited in above [1], has excellent cushioning property and proper stiffness; shows good slippage property under a lowly loaded condition and, therefore, good handling property; and yet exhibits a high gripping force under a highly loaded condition where the laminated foam interleaf sheet is sandwiched between glass plates. Therefore, the laminated foam interleaf sheet can effectively protect glass plates by being interposed therebetween.

Other objects, features and advantages of the present invention will become apparent from the detailed description of the preferred embodiments of the invention to follow.

DETAILED DESCRIPTION OF THE INVENTION

In one preferred embodiment of the present invention, the laminated foam interleaf sheet has a multi-layer structure and has a foam layer of a polyethylene-based resin, and an antistatic layer laminated and fusion-bonded on each of both sides of the foam layer. In the following description, the laminated foam interleaf sheet will be occasionally referred to simply as "interleaf sheet" and the two antistatic layers provided on both sides of the foam layer will be occasionally referred to as "antistatic layer" for simplicity of explanation.

The foam layer of the interleaf sheet is formed of a polyethylene-based resin. The term "polyethylene-based resin" as used in the present specification is intended to mean a resin containing at least 50 mole % of component units derived from ethylene. Examples of the polyethylene-based resin include low density polyethylene (LDPE), ethylene-vinyl acetate copolymer (EVA), liner low density polyethylene (LLDPE), very low density polyethylene (VLDPE) and mixtures of two or more thereof.

For the purpose of clarity, the polyethylene-based resin of the foam layer will be occasionally referred to as "polyethylene-based resin A", while the polyethylene-based resin contained in the antistatic layer will be occasionally referred to as "polyethylene-based resin B".

The polyethylene-based resin A (and also the polyethylene-based resin B) is preferably a resin containing low density polyethylene as a major component. The term "a resin containing low density polyethylene as a major component" is intended to refer to a resin that contains low density polyethylene in an amount of at least 50% by weight, preferably at least 60% by weight, more preferably at least 70% by weight, still more preferably at least 80% by weight, particularly preferably at least 90% by weight.

To the extent that the object and effect of the present invention are not impaired, the foam layer may contain one or more additives such as a synthetic resin other than polyethylene-based resin A, an elastomer, a cell controlling agent, a nucleating agent, an antioxidant, a heat stabilizer, a weathering agent, a UV absorbing agent, a flame retardant, an antibacterial agent, a shrink preventing agent and an inorganic filler.

The antistatic layer laminated on each of both sides of the foam layer contains a polyethylene-based resin B, a polystyrene-based resin and a polymeric antistatic agent. The polyethylene-based resin B, polystyrene-based resin and polymeric antistatic agent are in the form of a mixture. The polyethylene-based resin B of the antistatic layer may be the same as or different from the polyethylene-based resin A of the foam layer. For reasons of obtaining excellent bonding between the foam layer and the antistatic layer, however, it is preferred that these layers contain the same polyethylene-based resin. For reasons of obtaining particularly excellent gripping property under high load conditions, the polyethylene-based resin B is preferably a resin containing low density polyethylene as a major component.

The interleaf sheet of the present invention is hardly slipped or displaced under highly loaded conditions but shows good slippage property under lowly loaded conditions. It is believed that the good slippage property is obtained because of the presence of the polystyrene-based resin in the antistatic layer. Whereas the polyethylene-based resin is flexible and is not easily slipped relative to a glass plate, the polystyrene-based resin has a higher stiffness than the polyethylene-based resin and is considered to provide good slippage under a low load condition.

The polystyrene-based resin for use in the antistatic layer may be a styrene homopolymer or a copolymer mainly composed of styrene. Examples of the polystyrene-based resin include polystyrene (general purpose polystyrene), high impact polystyrene, a styrene-α-methylstyrene copolymer, a styrene-p-methylstyrene copolymer, a styrene-acrylic acid copolymer, a styrene-methacrylic acid copolymer, a styrene-maleic anhydride copolymer, a styrene-methyl methacrylate copolymer, a styrene-ethyl methacrylate copolymer, a styrene-methyl acrylate copolymer, a styrene-ethyl acrylate copolymer and a styrene-acrylonitrile copolymer. Above all, polystyrene and high impact polystyrene are preferred for reasons of easiness in obtaining desired antistatic layer. When the antistatic layer contains polystyrene-based resin having a high modulus of elasticity, the interleaf sheet shows not only proper rigidity or stiffness even when the thickness thereof is small but also good slippage property under lowly loaded conditions. Incidentally, the above-described styrenic homopolymers and copolymers may be used alone or in combination of two or more thereof. The styrene-based copolymer preferably contains styrene monomeric units in an amount of at least 50 mole %, more preferably at least 80 mole %.

From the standpoint of achieving proper stiffness and good slippage property of the interleaf sheet under a lowly loaded condition without deterioration of its cushioning property, the polystyrene-based resin is preferably present in the antistatic layer in an amount of 5 to 50% by weight. From the same standpoint, the lower limit of the polystyrene-based resin content is more preferably 10% by weight, still more preferably 20% by weight, while the upper limit thereof is more preferably 40% by weight, still more preferably 30% by weight.

From the standpoint of achievement of high gripping force under a highly loaded condition, the polyethylene-based resin B is preferably contained in the antistatic layer in an amount of 20 to 80% by weight.

It is preferred that the antistatic layer is able to give a tensile modulus of elasticity of 100 MPa or more for reasons of improved slippage property of the interleaf sheet under a lowly loaded condition. The upper limit of the tensile modulus of elasticity is generally preferably 300 MPa. Such a preferred range of the tensile modulus of elasticity may be attained by adjusting the polystyrene-based resin content in the antistatic layer to the above-described range.

The tensile modulus of elasticity of the antistatic layer is measured according to JIS K6767(1999) at a testing speed of 500 mm/min using a cut test piece of dumb-bell No. 1. As used herein, "tensile modulus of elasticity of the antistatic layer" refers to the tensile modulus of elasticity of the corresponding mixed resin composition from which the antistatic layer is produced. The term "mixed resin composition" as used herein is intended to include the polyethylene-based resin (B), polystyrene-based resin, polymeric antistatic agent and optionally employed compatibilizing agent but does not include non-resinous materials such as optionally employed additives and volatile plasticizers.

It is preferred that the antistatic layer contains a compatibilizing agent capable of improving compatibility between the polyethylene-based resin B and the polystyrene-based resin. By incorporation of the compatibilizing agent, the antistatic layer has an improved film forming property and, therefore, the desired antistatic layer can be formed even when the antistatic layer has a small basis weight.

Illustrative of suitable compatibilizing agents are styrenic elastomers such as styrene-butadiene copolymers, styrene-isoprene copolymers and hydrogenation products of these copolymers. The copolymers are preferably block copolymers. The styrenic elastomer preferably has a styrenic monomer unit content of 10 to 60% by weight, more preferably 15 to 50% by weight.

The compatibilizing agent may be preferably contained in the antistatic layer in an amount of 2 to 20% by weight based on the total weight of the polyethylene-based resin B, the polystyrene-based resin and the compatibilizing agent. The lower limit of the compatibilizing agent content is more preferably 3% by weight, while the upper limit thereof is more preferably 15% by weight, still more preferably 10% by weight.

It is believed that the compatibilizing agent serves to improve the dispersibility between the polystyrene-based resin and the polyethylene-based resin B and, hence, the obtained interleaf sheet has improved stiffness or rigidity. Thus, the interleaf sheet permits easy removal thereof from between glass plates by vacuum suction, even when the thickness thereof is thin.

The antistatic layer contains a polymeric antistatic agent. By incorporation of the polymeric antistatic agent, the antistatic layer shows excellent antistatic property so that the interleaf sheet provided with such antistatic layers is prevented from accumulating electrostatic charges and from deposited with dust. Generally, the interleaf sheet has a surface resistivity of $1\times10^7$ to $1\times10^{14}\Omega$, preferably $1\times10^7$ to $1\times10^{13}\Omega$. When the surface resistivity is within the above range, the interleaf sheet exhibits sufficient antistatic property and excellent dust deposition preventive function.

The surface resistivity as used herein is measured according to JIS K6271(2001). More specifically, a test piece (having a length of 100 mm, a width of 100 mm and a thickness equal to that of the interleaf sheet to be measured) is cut out from the interleaf sheet and subjected to conditioning adjustment by being allowed to stand in an environment with a temperature of 23° C. and a relative humidity of 50% for 24 hours. Then the test piece is impressed with a voltage of 500 V and measured for the surface resistivity 1 minute after the commencement of the voltage impression.

The polymeric antistatic agent may be a resin having a surface resistivity of $1\times10^{12}\Omega$ or less, preferably $1\times10^{11}\Omega$ or less, more preferably $1\times10^{10}\Omega$ or less. Examples of the resin include polyether, polyether ester amide, block copolymers of polyether and polyolefin and ionomer resins. Of these, block copolymers of polyether and polyolefin and ionomer resins are preferred, particularly ionomer resins are preferred.

Suitable block copolymers are those which have a structure in which polyolefin blocks and polyether blocks are alternately linked through a linkage such as an ester linkage, an amide linkage, an ether linkage, a urethane linkage and an imide linkage.

The ionomer resin used as the polymeric antistatic agent may be ethylene copolymers cross-linked by a metal salt. Examples of the ethylene copolymer include copolymers of ethylene and a carboxylic acid such as acrylic acid, methacrylic acid and maleic acid. Examples of the metal salt include alkali metal salts, alkaline earth metal salts, salts of other main group elements and salts of transition metal salts.

Specific examples of the polymeric antistatic agent include block copolymers of polyether and polyolefin such as those available from Sanyo Chemical Industries, Ltd. under the trade names of "PELESTAT 300", "PELESTAT 230", "PELESTAT HC250", "PELECTRON PVH", "PELECTRON PVL" and "PELECTRON HS", and ionomer resins such as those available from duPont-Mitsui Polychemicals Co., Ltd. under the trade names of "ENTIRA SD100" and "ENTIRA MK400".

It is preferred that the polymeric antistatic agent is contained in the antistatic layer in an amount of 2 to 30% by weight, more preferably 3 to 20% by weight, still more preferably 4 to 15% by weight, particularly preferably 5 to 15% by weight, though the amount thereof depends on the kind thereof. If desired, the polymeric antistatic agent may be also contained in the foam layer. The amount of the polymeric antistatic agent in the foam layer is preferably 2 to 15% by weight, more preferably 3 to 8% by weight, from the standpoint of suitable balance between the foamability at the time of extrusion foaming and the antistatic performance of the interleaf sheet.

It is important that the interleaf sheet of the present invention must have a surface roughness of 30 μm or less in order for the interleaf sheet to show a high gripping force under a highly loaded condition. When the surface roughness of the interleaf sheet is greater than 30 μm, a sufficient gripping force is not obtainable in a high load state. The reason for exerting a high gripping force under a highly loaded condition is considered to be that, when the interleaf sheet having a surface roughness Ra of 30 μm or less is pressed against a glass plate, the antistatic layer thereof is brought into close contact with the glass plate so that a gripping force is easily exerted from the antistatic layer due to the presence of the polyethylene-based resin B contained therein. Under a lowly loaded condition, good slippage property is obtained because of the presence of the polystyrene-based resin in the antistatic layer. The slippage property is also improved as the surface roughness Ra becomes lower. From the above points of view, the surface roughness Ra of the interleaf sheet is preferably less than 25 μm. The lower limit of the surface roughness Ra is not specifically limited from the standpoint of attainment of the object of the present invention. From the standpoint of easiness for producing interleaf sheets, however, the lower limit is generally about 10 μm. The surface roughness Ra of the interleaf sheet may be controlled by control of the average cell diameter of the interleaf sheet as described hereinafter.

As used herein, the surface roughness Ra is as measured according to JIS B0601(2001). As a measuring device for the surface roughness Ra, surface roughness measuring instrument SURFCODER (Model SE1700a) manufactured by Kosaka Laboratory Ltd. may be used.

It is preferred that the interleaf sheet has an average cell diameter of 0.10 mm or less in the thickness direction thereof. Too high an average cell diameter may cause an excessive increase of the surface roughness Ra of the interleaf sheet. From this point of view, the average cell diameter is preferably 0.09 mm or less. From the standpoint of production efficiency of the interleaf sheet, the lower limit of the average cell diameter is preferably about 0.03 mm.

As used herein, the average cell diameter of the interleaf sheet is as measured by the following method. An interleaf sheet is vertically cut along the extrusion direction thereof at a portion near the center of the transverse direction thereof. An enlarged image of the cross sections is photographed using a microscope or the like. On the enlarged image, straight line segments are drawn through the entire thickness of the interleaf sheet at randomly selected five or more positions. The number of cells that intersect the line segments is counted. The total length (mm) of the line segments is divided by the total of the counted cell numbers to give the average cell diameter (mm) of the interleaf sheet.

The interleaf sheet preferably has a thickness of 0.05 to 2 mm. In view of the fact that large and thin glass plates such as for use as liquid crystal panels are increasingly used in recent years, the upper limit of the thickness is preferably 1.5 mm, more preferably 1.3 mm, still more preferably 1.0 mm. From the standpoint of cushioning property, the lower limit of the thickness is preferably 0.07 mm, more preferably 0.10 mm.

The interleaf sheet preferably has an apparent density of 90 kg/m³ or more, more preferably 95 kg/m³ or more, still more preferably 100 kg/m³ or more.

When the apparent density of the interleaf sheet is excessively low, the stiffness thereof becomes so low that the aforementioned degree of drooping thereof tends to increase. Too large an apparent density, on the other hand, results in deterioration of the light-weight property of the interleaf sheet. From the above standpoint, the upper limit of the apparent density of the interleaf sheet is preferably 500 kg/m$^3$, more preferably 300 kg/m$^3$, still more preferably 200 kg/m$^3$, particularly preferably 150 kg/m$^3$.

The interleaf sheet preferably has a basis weight of 200 g/m$^2$ or less, more preferably 100 g/m$^2$ or less, still more preferably 50 g/m$^2$ or less, particularly preferably 30 g/m$^2$ or less, from the standpoint of easiness in handling. The lower limit of the basis weight is preferably about 10 g/m$^2$.

The two opposing antistatic layers of the interleaf sheet each preferably have a basis weight (weight per unit area) of 5 g/m$^2$ or less from the standpoint of light-weight property and cost thereof. The lower limit of the basis weight is about 1 g/m$^2$ from the standpoint of prevention of formation of holes in the antistatic layer.

As used herein the thickness of the interleaf sheet is an average of measured thickness values (mm) obtained at every 1 cm interval throughout the width thereof.

As used herein the apparent density (kg/m$^3$) of the interleaf sheet may be determined by dividing the basis weight (g/m$^2$) thereof by an average thickness (mm) thereof, followed by conversion of the unit into [kg/m$^3$].

The basis weight of the antistatic layer may be determined from the basis weight of the interleaf sheet and the discharge amounts of first and second melts (described hereinafter) for forming the foam layer and the antistatic layers through a coextrusion die. Alternatively, the basis weight of the antistatic layer may be obtained by multiplying the average thickness of the antistatic layer by the density of the antistatic layer.

The width of the interleaf sheet is preferably 1,000 mm or more so as to be usable for packaging large sized glass plates. The upper limit of the width is generally 5,000 mm. The interleaf sheet is generally obtained in the form of a roll.

The interleaf sheet preferably exhibits a static friction force of 0.25N or less, more preferably 0.20N or less, under a low load of 15 g (0.6 g/cm$^2$), when measured according to JIS K7125(1999) using a square test piece with a size of 50 mm×50 mm. An interleaf sheet showing a static friction force of the above range under the load of 15 g is easy in handling under free or lowly loaded conditions. It is also preferred that the interleaf sheet exhibits a static friction force of 2.5N or more, when measured in the same manner as above except for using a high load of 400 g (16 g/cm$^2$). When the interleaf sheets showing a static friction force of the above range under the load of 400 g are interposed between stacked glass plates, displacement or slip of the glass plates can be effectively prevented. The upper limit of the static friction force under the load of 400 g is generally about 5.0N.

The interleaf sheet preferably has a closed cell content of 15% or more, more preferably 20% or more from the standpoint of flexibility of the foam layer, surface protection property for materials to be packaged and slippage property.

As used herein, the closed cell content of the interleaf sheet is measured as follows. The interleaf sheet is cut to obtain a plurality of cut sheets each having a size of 25 mm×25 mm and a thickness equal to that of the interleaf sheet. The cut sheets are stacked one on top of another to obtain a test sample having a length of 25 mm, a width of 25 mm and a thickness of about 20 mm. The test sample is then measured for its true volume Vx according to Procedure C of ASTM D-2856-70 using Air Comparison Pycnometer Type-930 manufactured by Toshiba Beckman Inc. Using the measured true volume Vx, the closed cell content S (%) of the interleaf sheet is calculated by the formula (1) shown below.

$$S(\%)=(Vx-W/\rho)\times 100/(Va-W/\rho) \qquad (1)$$

wherein

Vx represents the true volume (cm$^3$) of the test sample measured by the above method, which corresponds to a sum of a volume of the resin constituting the test sample and a total volume of all the closed cells of the test sample, Va represents an apparent volume (cm$^3$) of the test sample, which is a sum of a volume of the resin constituting the test sample and a total volume of closed cells and open cells of the cut sample, W is a weight (g) of the test sample; and ρ is a density (g/cm$^3$) of the resin constituting the interleaf sheet, which is determined after the interleaf sheet has been defoamed by using a heat press.

The interleaf sheet having a foam layer and two antistatic layers provided on both sides of the foam layer may be produced by a method described below. The interleaf sheet is suitably produced by a coextrusion foaming process in which a first melt for forming the foam layer and a second melt for forming the antistatic layer are fed to a coextrusion die where they are combined and coextruded into a laminate. The extruded laminate is allowed to foam. The coextrusion foaming process is preferred since thin antistatic layers may be laminated on the foam layer and a high adhesion strength is attained between the foam layer and each antistatic layer. The surface roughness of the antistatic layer (namely surface roughness of the interleaf sheet) is influenced more greatly by the foam layer as the thickness of the antistatic layer becomes smaller especially when the coextrusion foaming process is adopted.

The coextrusion foaming process includes two different methods. One method uses a flat coextrusion die trough which a sheet like laminate is extruded and foamed to obtain the intended interleaf sheet. Another method uses a circular die through which a tubular laminate is extruded and foamed, the tubular extruded laminate being then drawn and enlarged (blow-up) over a mandrel and cut open to obtain the intended interleaf sheet. Of these methods, the method using a circular die is preferred for reasons of easiness in producing a wide interleaf sheet having a width of 1,000 mm or more.

A method for producing the interleaf sheet by a coextrusion foaming process using a circular die will be next described in detail. The polyethylene-based resin A and, if necessary, one or more additives such as a cell controlling agent are fed to an extruder and heated and kneaded, into which a physical blowing agent is injected. The resulting mixture is further kneaded to obtain a first melt for forming the foam layer. At the same time, the polyethylene-based resin B, polystyrene-based resin, polymeric antistatic agent and, if necessary, one or more additives such as a compatibilizing agent are fed to another extruder and heated and kneaded to obtain a second melt for forming the antistatic layer. The first and second melts are fed to a circular coextrusion die.

It is preferred that the polyethylene-based resin A has a melt flow rate (MFR) of 0.5 g/10 min to 15 g/10 min from the standpoint of foamability of the foam layer. It is also preferred that the polyethylene-based resin B has MFR that is equal to or greater than that of the polyethylene-based resin A from the standpoint of coextrusion efficiency. In particular, MFR of the polyethylene-based resin B is preferably 5.0 g/10 min to 15 g/10 min, more preferably 6.0 g/10 min to 14 g/10 min for reasons of easiness in carrying out the coextrusion.

It is preferred that the polystyrene-based resin has MFR of 5.0 g/10 min to 30 g/10 min, more preferably 5.0 g/10 min to 15 g/10 min, still more preferably 6.0 g/10 min to 14 g/10 min from the standpoint of film forming property of the antistatic layer. It is also preferred that a ratio of MFR of the polystyrene-based resin to MFR of the polyethylene-based resin B is in the range of 0.5:1 to 2:1, more preferably 0.5:1 to 1.5:1, still more preferably 0.5:1 to 1:1.

As used herein, any of the above MFR is as measured according to JIS K7210(1999) under condition H (at a temperature of 200° C. and a load of 5 kg).

It is preferred that the second melt for forming the antistatic layer contains a volatile plasticizer. As the volatile plasticizer, there may be mentioned a substance which has a function to lower the melt viscosity of the second melt and which disappears by vaporization from the antistatic layer after the formation of the antistatic layer on the foam layer. When the volatile plasticizer is incorporated into the second melt for forming the antistatic layer, the temperature at which the second melt is extruded can be made near the temperature at which the first melt for forming the foam layer is extruded (extrusion temperature lowering effect). Additionally, melt stretchability of the antistatic layer in a molten state is significantly improved (stretchability improving effect). Thus, because of the temperature lowering effect, the cell structure of the foam layer is not easily broken by the heat of the antistatic layer at the time of the coextrusion foaming. Further, because of the stretchability improving effect, the antistatic layer can be stretched following the foam layer during the foaming stage.

The volatile plasticizer is preferably at least one selected from aliphatic and alicyclic hydrocarbons having 3 to 7 carbon atoms, aliphatic alcohols having 1 to 4 carbon atoms and aliphatic ether having 2 to 8 carbon atoms. When a low volatile substance such as a lubricant is used as the plasticizer, the low volatile plasticizer remains in the antistatic layer and may stain a surface of a material, such as a glass, to be packaged. In contrast, the volatile plasticizer is preferable because it can efficiently plasticize the second melt for forming the antistatic layer and because it hardly remains in the obtained antistatic layer.

It is preferred that the volatile plasticizer has a boiling point of 120° C. or less, more preferably 80° C. or less for reasons of easy volatilization thereof from the antistatic layer. The volatile plasticizer which has a boiling point in the above range volatilizes and disappears from the antistatic layer immediately after completion of the coextrusion foaming or is spontaneously removed from the antistatic layer by being allowed to stand at room temperature. The lower limit of the boiling point of the volatile plasticizer is about −50° C.

It is preferred that the volatile plasticizer is used in an amount of 5 to 50 parts by weight based on 100 parts by weight of a total amount of the polyethylene-based resin B, polystyrene-based resin, polymeric antistatic agent and, when used, corn patibilizing agent that are used for forming the antistatic layer.

The second melt for forming the antistatic layer may additionally contain one or more additives to the extent that the object of the present invention is not adversely affected. Examples of the additives include an antioxidant, a heat stabilizer, a weathering stabilizer, a UV absorbing agent, a flame retardant, a filler and an antibacterial agent. The addition amount of the additive or additives may be suitably determined in view of the object and effect thereof but is preferably 10% by weight or less, more preferably 5% by weight or less, still more preferably 3% by weight or less, based on 100% by weight of the antistatic layer.

The physical blowing agent that is incorporated into the first melt for forming the foam layer may be organic or inorganic physical blowing agent. As the organic physical foaming agent, there may be mentioned, for example, aliphatic hydrocarbons such as propane, n-butane, isobutane, n-pentane, isopentane, n-hexane and isohexane; alicyclic hydrocarbons such as cyclopentane and cyclohexane; chlorinated hydrocarbons such as methyl chloride and ethyl chloride; fluorinated hydrocarbons such as 1,1,1,2-tetrafluoroethane and 1,1-difluoroethane. As the inorganic physical foaming agent, there may be mentioned, for example, nitrogen, carbon dioxide, air and water. These physical blowing agents may be used as a mixture of two or more thereof. If desired, a decomposition type blowing agent such as azodicarbonamide may be used. Above all, organic physical blowing agents, particularly those which contain as their major ingredient n-butane, isobutane or a mixture thereof, are preferred.

The addition amount of the blowing agent is controlled in view of the kind of the blowing agent and the intended apparent density of the interleaf sheet. When a mixed butane blowing agent such as a mixture of 30% by weight of isobutane and 70% by weight of n-butane is used as a physical blowing agent, the addition amount thereof is preferably 3 to 30% by weight, more preferably 4 to 20% by weight, more preferably 6 to 18% by weight, based on 100 parts by weight of the base resin which consists of the polyethylene-based resin A and, when used, other synthetic resin.

Among the additives that are optionally added to the first melt for forming the foam layer, a cell controlling agent is particularly important. As the cell controlling agent, there may be used an inorganic or organic material. Examples of the inorganic cell controlling agent include metal salts of boric acid such as zinc borate, magnesium borate and borax, sodium chloride, aluminum hydroxide, talc, zeolite, silica, calcium carbonate and sodium bicarbonate. Examples of the organic cell controlling agent include sodium 2,2-methylene-bis(4,6-di-t-butylphenyl)phosphate, sodium benzoate, calcium benzoate, aluminum benzoate and sodium stearate. Also usable as the cell controlling agent is a sodium bicarbonate-citric acid-type chemical blowing agent that uses, for example, a combination of sodium bicarbonate with citric acid or a combination of sodium bicarbonate with an alkali metal salt of citric acid. These cell controlling agents may be used singly or in combination of two or more thereof.

The surface roughness Ra of the interleaf sheet may be controlled to 30 μm or less by adjusting the average cell diameter of the foam layer that is formed by coextrusion together with the antistatic layers. The average cell diameter of the foam layer may be preferably adjusted by controlling the amount of the cell controlling agent. The amount of the cell controlling agent varies depending upon the kind of thereof, the kind of the polyethylene-based resin, etc. For example, when talc is used as the cell controlling agent, the amount thereof is preferably 0.3 to 2.5 parts by weight, more preferably 0.5 to 2.0 parts by weight per 100 parts by weight of the base resin which consists of the polyethylene-based resin A and, when used, other synthetic resin.

The interleaf sheet according to the present invention has excellent cushioning property and proper stiffness and is particularly useful for protecting large-sized thin glass plates by being interposed therebetween. Under a lowly loaded condition during a process for stacking glass plates, the interleaf sheets which show good slippage property and good handling property can be easily fed and placed successively on each of the glass plates. Under a highly loaded condition where the interleaf sheets are each interposed between adjacent glass plates, the interleaf sheets exhibit a high gripping force and can effectively protect the glass plates.

EXAMPLES

The following examples and comparative examples will further illustrate the present invention. The present invention is not limited to the examples presented, however.

The polyethylene-based resin and polystyrene-based resin used in the examples and comparative examples are shown in Table 1. The polymeric antistatic agent and compatibilizing agent (styrenic elastomer) used in the examples and comparative examples are shown in Table 2. The melt flow rate shown in Table 1 is as measured according to JIS K7210(1999), Condition H (200° C., load of 5 kg).

TABLE 1

| Abbreviation | Kind | Maker | Product name | Density (g/cm³) | Melting point (° C.) | MFR (g/10 min) |
| --- | --- | --- | --- | --- | --- | --- |
| LDPE | Low density polyethylene | Dow Chemical Japan Limited | NUC8321 | 0.922 | 112 | 11.8 |
| PS | High impact polystyrene | PS Japan Co., Ltd. | 408 | 1.04 | — | 7.0 |

TABLE 2

| Abbreviation | Kind | | Maker | Product name |
| --- | --- | --- | --- | --- |
| ASP | Polymeric antistatic agent | Ethylenic ionomer resin | Du Pont-Mitsui Polychemicals Co., Ltd. | SD100 |
| SBS | Styrenic elastomer | Styrene-butadiene-styrene block copolymer* | JSR Corporation | TR2000 |

*Styrene component content in SBS is 40% by weight.

As a physical blowing agent, mixed butane composed of 70% by weight of n-butane and 30% by weight of isobutane was used.

As a cell controlling agent, a master batch composed of 80% by weight of the low density polyethylene and 20% by weight of talc (HI-Filler #12 manufactured by Matumura Sangyo Co., Ltd.) was used.

For forming a foam layer, a tandem extruder having a first extruder with an inside diameter of 90 mm and a second extruder with an inside diameter of 120 mm connected downstream of the first extruder was used. For forming antistatic layers, a third extruder with a diameter of 50 mm and L/D of 50 was used. Each of the outlet sides of the second extruder and the third extruder was connected to a coextrusion circular die so that the melts from these two extruders were combined and laminated in the coextrusion circular die.

Examples 1 to 4 and Comparative Examples 1 to 5

To a feed inlet port of the first extruder were supplied the polyethylene-based resin A in an amount shown in Table 3 and the cell controlling agent master batch in such an amount that the cell controlling agent was fed in an amount shown in Table 3. The feeds were melted and kneaded to obtain a resin melt with a controlled temperature of about 200° C. Then, the mixed butane as a physical blowing agent was injected into the resin melt in an amount shown in Table 3 and melted and kneaded. The kneaded mass was then fed to the second extruder connected downstream of the first extruder and adjusted at 115° C. to obtain a first melt for forming a foam layer. The first melt was then introduced into the coextrusion circular die.

At the same time, the polyethylene-based resin B, polystyrene-based resin, polymeric antistatic agent and styrenic elastomer (compatibilizing agent) were supplied to the third extruder in amounts shown in Table 3 and melted and kneaded. Then, the mixed butane as a volatile plasticizer was injected into the kneaded mass in the third extruder in an amount shown in Table 3 and kneaded to obtain a second melt for forming antistatic layers. The second melt was adjusted to a temperature of 117° C. and fed to the coextrusion circular die. The discharge amount of the second melt for forming antistatic layers was so adjusted that the basis weight of the obtained laminated foam interleaf sheet and the basis weight of each of the antistatic layers were as shown in Table 4.

In the coextrusion circular die, the first and second melts were introduced into three separate tubular passageways and finally combined such that two tubular streams of the second melt for forming the antistatic layers were laminated on the inner and outer sides of the tubular stream of the first melt for forming the foam layer. The combined streams were then coextruded and discharged through a coextrusion die having a lip diameter of 135 mm into the atmosphere to obtain a tubular laminate foam product with a three-layered structure of (antistatic layer)/(foam layer)/(antistatic layer). The tubular laminate foam product was drawn, while being enlarged over a mandrel with a blow-up ratio of 3.47, and cut open in the extrusion direction. The obtained laminate foam interleaf sheet, which had a width of 1,400 mm and was composed of the foam layer and antistatic layers laminated on both sides of the foam layer, was wound into a roll. The draw rate of the tubular laminate was adjusted so that the basis weight of the laminate foam interleaf sheet was as shown in Table 4.

Various physical properties of the laminated foam interleaf sheets obtained in Examples and Comparative Examples were as shown in Table 4. Methods for measuring the physical properties are described below.

TABLE 3

| | Foam Layer | | | Antistatic Layer | | | |
| --- | --- | --- | --- | --- | --- | --- | --- |
| | Polyethylene-Based Resin A | | Cell Controlling Agent | Blowing Agent | Mixed Resin Composition | | Volatile Plasticizer |
| | Kind | Amount [part by weight] | Amount [part by weight] | Amount [part by weight] | Kinds of Resins | Amounts of Resins [part by weight] | Tensile Modulus of Elasticity [MPa] | Amount [part by weight] |
| Example 1 | LDPE | 100 | 0.28 | 11 | LDPE/PS/ASP/SBS | 60/25/10/5 | 195 | 18 |
| Example 2 | LDPE | 100 | 0.26 | 11 | LDPE/PS/ASP/SBS | 60/25/10/5 | 195 | 18 |
| Example 3 | LDPE | 100 | 0.18 | 11 | LDPE/PS/ASP/SBS | 60/25/10/5 | 195 | 18 |
| Example 4 | LDPE | 100 | 0.12 | 11 | LDPE/PS/ASP/SBS | 60/25/10/5 | 195 | 18 |
| Comparative Example 1 | LDPE | 100 | 0.28 | 11 | LDPE/ASP | 90/10 | 55 | 18 |
| Comparative Example 2 | LDPE | 100 | 0.26 | 11 | LDPE/ASP | 90/10 | 55 | 18 |
| Comparative Example 3 | LDPE | 100 | 0.20 | 11 | LDPE/ASP | 90/10 | 55 | 18 |
| Comparative Example 4 | LDPE | 100 | 0.16 | 11 | LDPE/ASP | 90/10 | 55 | 18 |
| Comparative Example 5 | LDPE | 100 | 0.10 | 11 | LDPE/PS/ASP/SBS | 60/25/10/5 | 195 | 18 |

TABLE 4

| | Laminated Foam Interleaf Sheet | | | | | Physical Properties | | | | |
| --- | --- | --- | --- | --- | --- | --- | --- | --- | --- | --- |
| | Thickness [mm] | Apparent Density [kg/m³] | Basis Weight [g/m²] | Surface Roughness (Ra) [µm] | Average Cell Diameter [mm] | Basis Weight of Antistatic Layer [g/m²] | Static Friction Force | | Surface Resistivity [Ω] | Degree of Drooping [mm] |
| | | | | | | | Low Load [N] | High Load [N] | | |
| Example 1 | 0.15 | 115 | 17 | 17 | 0.06 | 2 | 0.10 | 3.1 | $5 \times 10^{12}$ | 65 |
| Example 2 | 0.15 | 115 | 17 | 22 | 0.08 | 2 | 0.19 | 2.8 | $5 \times 10^{12}$ | 65 |
| Example 3 | 0.15 | 115 | 17 | 25 | 0.09 | 2 | 0.15 | 2.7 | $5 \times 10^{12}$ | 65 |
| Example 4 | 0.15 | 115 | 17 | 28 | 0.10 | 2 | 0.24 | 2.5 | $5 \times 10^{12}$ | 65 |
| Comparative Example 1 | 0.15 | 115 | 17 | 14 | 0.07 | 2 | 0.48 | 3.5 | $5 \times 10^{12}$ | 85 |
| Comparative Example 2 | 0.15 | 115 | 17 | 21 | 0.08 | 2 | 0.40 | 3.9 | $5 \times 10^{12}$ | 85 |
| Comparative Example 3 | 0.15 | 115 | 17 | 30 | 0.08 | 2 | 0.47 | 3.6 | $5 \times 10^{12}$ | 85 |
| Comparative Example 4 | 0.15 | 115 | 17 | 33 | 0.09 | 2 | 0.41 | 3.6 | $5 \times 10^{12}$ | 85 |
| Comparative Example 5 | 0.15 | 115 | 17 | 33 | 0.11 | 2 | 0.23 | 2.1 | $5 \times 10^{12}$ | 65 |

Tensile Modulus of Elasticity of Antistatic Layer:

The tensile modulus of elasticity shown in Table 3 was measured and determined as follows (n=5). A mixed resin composition from which the antistatic layer was prepared was measured for its tensile modulus of elasticity. Thus, raw material resins for forming the antistatic layer were fed to a single-axis extruder (L/D=50) and kneaded at 200° C. to obtain a kneaded mixture having the same composition as that of the antistatic layer. The kneaded mixture was heat-pressed at 250° C. to obtain a plate having a thickness of 0.7 mm. The plate was punched to obtain five cut test pieces of dumb-bell No. 1. Each test piece was measured for its tensile modulus of elasticity according to JIS K6767 (1999) at a testing speed of 500 mm/min. The arithmetic mean of the measured values of the five test pieces is the tensile modulus of elasticity of the mixed resin composition. The thus obtained tensile modulus of elasticity of the mixed resin composition from which the antistatic layer was produced is defined as the tensile modulus of elasticity of the antistatic layer.

Thickness of Interleaf Sheet:

The thickness of the interleaf sheet shown in Table 4 was measured and determined in the manner described previously (n=5).

Basis Weight of Interleaf Sheet:

The basis weight of the interleaf sheet shown in Table 4 was measured and determined as follows (n=5). The interleaf sheet was unrolled and cut laterally throughout its width to obtain five test pieces with a width of 10 cm and a length equal to the width of the rolled interleaf sheet. Each of the test pieces was weighed and the weight of each test piece was divided by the area thereof to obtain a basis weight. The arithmetic mean of the measured values of the five test pieces is defined as the basis weight of the interleaf sheet.

Basis Weight of Antistatic Layer:

The basis weight of the antistatic layer shown in Table 4 was determined from the basis weight of the interleaf sheet and the discharge amounts of the resin compositions for forming the foam layer and the antistatic layers through the coexrusion die.

Apparent Density of Interleaf Sheet:

The apparent density of the interleaf sheet shown in Table 4 was calculated by dividing the basis weight of the interleaf sheet by the thickness thereof.

Degree of Drooping of Interleaf Sheet:

The degree of drooping of the interleaf sheet was measured as follows. Ten test pieces each having a length of 200 mm and a width of 100 mm were cut out from at randomly selected 10 locations of the interleaf sheet such that the lengthwise direction of each test piece coincides with the extrusion direction of the interleaf sheet. Each test piece was fixed on a flat horizontal table such that its first half (100 mm) was protruded from an edge of the table and the other second half was maintained in contact with the table. Thus, the unsupported first half portion of the test piece droops or flexes downward due to its own weight. The vertical distance between the table surface and the drooped end of the first half was measured. The arithmetic mean of the ten measured values of the ten test pieces is defined as the drooping degree of the interleaf sheet.

Surface Resistivity of Interleaf Sheet:

The surface resistivity of the interleaf sheet shown in Table 4 was measured as follows. From the interleaf sheet, three test pieces each having a length of 100 mm, a width of 100 mm and a thickness equal to the thickness of the interleaf sheet were cut out. The test pieces were then subjected to state conditioning in an atmosphere with a temperature of 23° C. and a relative humidity of 50% for 24 hours. After the state conditioning, a voltage of 500V was applied to each test piece and the surface resistivity value is measured one minute after the voltage application using a measurement instrument Model TR8601 manufactured by Takeda Riken Industry Co., Ltd. The surface resistivity was measured on each of the both surfaces of each test piece. The arithmetic mean of the thus obtained six measured values is defined as the surface resistivity of the interleaf sheet.

Surface Roughness Ra of Interleaf Sheet:

The surface roughness Ra shown in Table 4 was measured according to JIS B0601(2001) using surface roughness measuring instrument SURFCODER (Model SE1700a) manufactured by Kosaka Laboratory Ltd. More specifically, an interlayer sheet was measured for its surface roughness Ra at three randomly selected locations. In each location, a surface roughness was measured in each of the both sides of the interleaf sheet and in each of the lateral and extrusion directions through a measurement length of 8 mm to obtain twelve (12) measured values in total. The arithmetic mean of the twelve measured values is defined as the surface roughness Ra of the interleaf sheet.

Static Friction Force of Interleaf Sheet Under Low Load:

The static friction forth under a low load condition (at 15 g (0.6 g/cm$^2$)) shown in Table 4 was measured according to JIS K7125(1999) using TENSILON universal testing machine (Model RTC-1250A manufactured by Orientec Co., Ltd.) as follows (n=6). From an interleaf sheet, six square 50 mm×50 mm test pieces were cut out such that one side thereof coincides with the extrusion direction of the interleaf sheet. The test pieces were then subjected to state conditioning in an atmosphere with a temperature of 23° C. and a relative humidity of 50% for 24 hours. After the state conditioning, each test piece was fixed on a bottom face of a jig having a weight of 15 g and a bottom size of 50 mm×50 mm, and then placed on a slide glass (product of Matsunami Glass Ind., Ltd., Product Name: Large-size Slide Glass White Edge-polished No. 2; Product Number: S911"). The measurement jig was pulled horizontally in the direction which coincides with the extrusion direction of the interleaf sheet at a rate of 100 mm/min so that the test piece was slid on the slide glass. The first maximal point load measured at this slide movement represents the static friction force (N). Three of the six test pieces were each measured for the static friction force on that side which had been in contact with the mandrel during the production of the interleaf sheet, while the rest of three test pieces were each measured on the opposite side. The arithmetic mean of the obtained six measured values is defined as the static friction force (N).

Static Friction Force of Interleaf Sheet Under High Load:

The static friction forth under a high load condition (at 400 g (16 g/cm$^2$)) shown in Table 4 was measured in the same manner as described immediately above except for placing a weight of 385 g on the measurement jig.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein. The teachings of Japanese Patent Application No. 2015-90420, filed Apr. 27, 2015, inclusive of the specification, claims and drawings, are hereby incorporated by reference herein.

What is claimed is:

1. A laminated foam interleaf sheet for glass plates, comprising:
 a foam layer of a polyethylene-based resin, and
 an antistatic layer laminated on each of both sides of the foam layer and containing a polyethylene-based resin, a polystyrene-based resin, a styrenic elastomer, and a polymeric antistatic agent,
 wherein the antistatic layer of the laminated foam interleaf sheet has a surface roughness Ra in the range of 17 μm or more and 30 μm or less,
 wherein a ratio of a melt flow rate of the polystyrene-based resin of the antistatic layer to a melt flow rate of the polyethylene-based resin of the antistatic layer is in the range of 0.5:1 to 2:1,
 and wherein the antistatic layer has a basis weight of less than 5 g/m$^2$,
 wherein the polystyrene-based resin is present in the antistatic layer in an amount of 20 to 40% by weight, and
 wherein the interleaf sheet exhibits a static friction force of 0.25 N or less under a load of 15 g and a static friction force of 2.5 N or more under a load of 400 g, when measured according to JIS K7125 (1999) using a square test piece with a size of 50 mm×50 mm.

2. The laminated foam interleaf sheet according to claim 1, wherein the polymeric antistatic agent is an ionomeric antistatic agent.

3. The laminated foam interleaf sheet according to claim 1, wherein the polyethylene-based resin of the foam layer contains at least 50% by weight of low density polyethylene and polyethylene-based resin of the antistatic layer contains at least 50% by weight of low density polyethylene.

4. The laminated foam interleaf sheet according to claim 1, wherein the laminated foam interleaf sheet has an apparent density of 90 to 500 kg/m³.

5. The laminated foam interleaf sheet according to claim 1, wherein the antistatic layer has a tensile modulus of elasticity of at least 100 MPa.

6. The laminated foam interleaf sheet according to claim 1, wherein the melt flow rates of the polyethylene-based resin and the polystyrene-based resin of the antistatic layer are 5.0 g/10 min to 15 g/10 min and 5.0 g/10 min to 30 g/10 min, respectively.

7. A laminated foam interleaf sheet for glass plates, comprising:
   a foam layer of a polyethylene-based resin, and
   an antistatic layer laminated on each of both sides of the foam layer and containing a polyethylene-based resin, a polystyrene-based resin, a styrenic elastomer, and a polymeric antistatic agent,
   wherein the antistatic layer of the laminated foam interleaf sheet has a surface roughness Ra in the range of 17 μm or more and 30 μm or less,
   wherein a ratio of a melt flow rate of the polystyrene-based resin of the antistatic layer to a melt flow rate of the polyethylene-based resin of the antistatic layer is in the range of 0.5:1 to 2:1,
   wherein the antistatic layer has a tensile modulus of elasticity between 100 MPa and 300 MPa,
   wherein the polystyrene-based resin is present in the antistatic layer in an amount of 20 to 40% by weight, and
   wherein the interleaf sheet exhibits a static friction force of 0.25 N or less under a low load of 15 g and a static friction force of 2.5 N or more under a high load of 400 g, when measured according to JIS K7125 (1999) using a square test piece with a size of 50 mm×50 mm.

8. The laminated foam interleaf sheet according to claim 1, wherein the basis weight the basis weight of the antistatic layer is between about 1 g/m² and about 2 g/m².

* * * * *